United States Patent
Wu et al.

(10) Patent No.: US 11,240,827 B2
(45) Date of Patent: *Feb. 1, 2022

(54) COEXISTENCE MANAGEMENT OF GNSS AND WIRELESS OPERATIONS

(71) Applicant: QUALCOMM Incorporated, San Diego, CA (US)

(72) Inventors: Jie Wu, San Diego, CA (US); Chun-Hao Hsu, San Jose, CA (US); Liang Zhao, Saratoga, CA (US); Parvathanathan Subrahmanya, Sunnyvale, CA (US); Amit Mahajan, San Diego, CA (US); Nitin Pant, San Diego, CA (US); Vieri Vanghi, Florence (IT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/030,971

(22) Filed: Sep. 24, 2020

(65) Prior Publication Data

US 2021/0022155 A1    Jan. 21, 2021

Related U.S. Application Data

(63) Continuation of application No. 16/438,816, filed on Jun. 12, 2019, now Pat. No. 10,841,932, which is a
(Continued)

(51) Int. Cl.
*H04W 72/12* (2009.01)
*H04W 52/02* (2009.01)
(Continued)

(52) U.S. Cl.
CPC ......... *H04W 72/1215* (2013.01); *G01S 19/14* (2013.01); *G01S 19/21* (2013.01);
(Continued)

(58) Field of Classification Search
CPC . H04W 72/02; H04W 72/0493; H04W 72/10; H04W 72/1215; H04W 72/1247;
(Continued)

(56) References Cited

U.S. PATENT DOCUMENTS 10,412,752 B2   9/2019  Wu et al.
2005/0009482 A1*   1/2005  Han .................. G01S 19/36
                                                      455/133
(Continued)

FOREIGN PATENT DOCUMENTS

CN   102450050   5/2012

OTHER PUBLICATIONS

International Search Report and Written Opinion—PCT/US2017/039283—ISA/EPO—dated Sep. 6, 2017.

*Primary Examiner* — Joshua Kading
(74) *Attorney, Agent, or Firm* — Qualcomm Incorporated

(57) ABSTRACT

Methods, systems, computer-readable media, and apparatuses for to managing use of a satellite positions system (SPS) receiver in conjunction with one or more radio access technology (RAT) transmitters. In certain embodiments, a controller can be used to prioritize reception by the SPS receiver over transmission by the one or more RAT transmitters.

21 Claims, 6 Drawing Sheets

Related U.S. Application Data continuation of application No. 15/402,045, filed on Jan. 9, 2017, now Pat. No. 10,412,752.

(60) Provisional application No. 62/366,964, filed on Jul. 26, 2016.

(51) Int. Cl.

| | | |
|---|---|---|
| *G01S 19/14* | (2010.01) | |
| *H04W 72/02* | (2009.01) | |
| *H04W 72/10* | (2009.01) | |
| *H04W 52/24* | (2009.01) | |
| *G01S 19/21* | (2010.01) | |
| *H04B 1/3805* | (2015.01) | |
| *H04W 64/00* | (2009.01) | |
| *H04W 72/14* | (2009.01) | |
| *H04B 1/525* | (2015.01) | |
| *H04W 88/06* | (2009.01) | |

(52) U.S. Cl.
CPC ...... *H04B 1/3805* (2013.01); *H04W 52/0245* (2013.01); *H04W 52/244* (2013.01); *H04W 52/245* (2013.01); *H04W 64/003* (2013.01); *H04W 72/02* (2013.01); *H04W 72/10* (2013.01); *H04W 72/1247* (2013.01); *H04W 72/14* (2013.01); *H04B 1/525* (2013.01); *H04W 52/0258* (2013.01); *H04W 88/06* (2013.01); *Y02D 30/70* (2020.08)

(58) Field of Classification Search
CPC ............. H04W 72/1257; H04W 72/14; H04W 52/0225; H04W 52/0238; H04W 52/0245; H04W 52/0258; H04W 52/243; H04W 52/244; H04W 52/245; H04W 52/34; H04W 64/003; H04W 88/06; G01S 19/21; H04B 1/525

See application file for complete search history.

(56) References Cited

U.S. PATENT DOCUMENTS

| | | | |
|---|---|---|---|
| 2009/0033550 A1 | 2/2009 | Wolf | |
| 2010/0316027 A1* | 12/2010 | Rick | ...................... H04W 88/06 370/336 |
| 2011/0021166 A1 | 1/2011 | Walley et al. | |
| 2011/0053523 A1* | 3/2011 | Yeh | ........................ H04B 1/406 455/73 |
| 2011/0312288 A1 | 12/2011 | Fu et al. | |
| 2012/0176923 A1 | 7/2012 | Hsu et al. | |
| 2013/0072254 A1* | 3/2013 | Korner | ...................... H01Q 7/00 455/552.1 |
| 2014/0036882 A1 | 2/2014 | Baghel et al. | |
| 2014/0226502 A1* | 8/2014 | Behnamfar | ........... H04L 1/0002 370/252 |
| 2014/0328331 A1* | 11/2014 | Truong | ................... H04W 4/80 370/336 |
| 2015/0133171 A1 | 5/2015 | Bani et al. | |
| 2015/0288416 A1 | 10/2015 | Goldberg et al. | |
| 2015/0309177 A1 | 10/2015 | Wallace et al. | |
| 2015/0316652 A1* | 11/2015 | Wietfeldt | ................ G01S 19/28 342/357.51 |
| 2016/0088634 A1* | 3/2016 | Wang | .................... H04W 28/10 370/336 |
| 2016/0233942 A1 | 8/2016 | Ling | |
| 2016/0234748 A1 | 8/2016 | Chrisikos et al. | |
| 2016/0337047 A1* | 11/2016 | Khoshnevisan | ..... H04B 17/318 |
| 2018/0035444 A1 | 2/2018 | Wu et al. | |
| 2018/0176848 A1* | 6/2018 | Tabet | .................... H04W 36/06 |
| 2019/0297633 A1 | 9/2019 | Wu et al. | |

* cited by examiner

COEXISTENCE MANAGEMENT OF GNSS AND WIRELESS OPERATIONS

CROSS-REFERENCE TO RELATED APPLICATIONS

This application for patent is a continuation of U.S. application Ser. No. 16/438,816, entitled "COEXISTENCE MANAGEMENT OF GNSS AND WIRELESS OPERATIONS", filed Jun. 12, 2019, which is a continuation of U.S. application Ser. No. 15/402,045, entitled "COEXISTENCE MANAGEMENT OF GNSS AND WIRELESS OPERATIONS", filed Jan. 9, 2017, now U.S. Pat. No. 10,412,752 issued Sep. 10, 2019 which claims priority to U.S. Provisional Application No. 62/366,964, filed Jul. 26, 2016, all of which are incorporated by reference herein in their entirety for all purposes.

BACKGROUND

Aspects of the disclosure relate to wireless communications, and more particularly to managing use of a satellite positioning system (SPS) receiver in conjunction with one or more radio access technology (RAT) transceivers.

The use of wireless communication technologies is becoming more prevalent with a wide variety of devices. Some devices can be referred to as Internet of Thing (IoT) devices. Examples of IoT devices can include consumer electronics such as watches, thermostats, blenders, light switches, etc. The use of wireless communication technologies within these devices can enable certain functionalities of IoT devices. For example, a user of an internetworked device (such as a smartphone) may be able to remotely command a blender, thermostat, light switch, or other IoT device to operate without being in physical proximity to the device.

Certain IoT devices can include SPS functionality to enable locating an IoT device by a user of an internetworked device, by a manufacturer of the device, or by a service provider of a service that the device provides, for example. Certain IoT devices can be commodity or similar devices wherein cost is of relatively high concern as profit margins for these devices can be relatively minimal. As such, there is need for improvement in the field of wireless communication devices.

BRIEF SUMMARY

Certain embodiments are described that provide techniques for managing use of an SPS receiver in conjunction with one or more RAT transceivers.

In certain embodiments, techniques are disclosed including a satellite positioning system (SPS) receiver; a transmitter operating in accordance with a radio access technology (RAT); and a controller communicatively coupled to the SPS receiver and the transmitter. The controller can be configured to prioritize reception by the SPS receiver over transmission by the transmitter in accordance with the RAT, by: (1) determining that the SPS receiver is receiving a first signal to determine a location of the SPS receiver; and (2) in response to determining that the SPS receiver is receiving the first signal, inducing the transmitter to either: (a) delay a second signal from being transmitted by the transmitter while the first signal is received by the SPS receiver and the location of the SPS has not been determined; or (b) transmit the second signal at a low power level while the first signal is received by the SPS receiver, the low power level determined to allow reception of the first signal by the SPS receiver.

The controller can be further configured to select the low power level based on a determination that the second signal transmitted at the low power level will be received by a station. The controller can additionally be configured to select the low power level based on a determination that a prior signal transmitted by the transmitter was received at the station. The controller can also be configured to select the low power level based on a power level of a signal received from the station.

The controller can be further configured to receive a grant command from a station indicating that the apparatus is granted permission for the transmission. The prioritizing the reception by the SPS receiver over the transmission by the transmitter in accordance with the RAT can be based on the receiving of the grant command. The controller can be configured to inhibit the transmitter from transmitting unless a grant command is received by the controller from a station. The controller can also be configured to, in response to determining that there is an overlap between a reception by the SPS receiver and a transmission at the transmitter, disregard positioning information derived from a portion of the reception that overlaps with the transmission.

In certain embodiments, the controller can be configured to induce the transmitter to delay the second signal from being transmitted while the first signal is received by the SPS receiver or a location of the SPS has not been determined; and not transmit the second signal while the first signal is received by the SPS receiver. The controller can be configured to induce the transmitter to: transmit the second signal at the low power level while the first signal is received by the SPS receiver; and not delay the second signal from being transmitted while the first signal is received by the SPS receiver.

The controller can also be configured to determine whether the transmission by the transmitter in accordance with the RAT is prioritized over the reception by the SPS receiver; and, in response to determining that the transmission by the transmitter in accordance with the RAT is prioritized over the reception by the SPS receiver. (1) induce the transmitter to transmit the second signal; and (2) either: (a) blank the SPS receiver from deriving positioning information based on the reception; or (b) power down the SPS receiver. The determining of whether to blank the SPS receiver or power down the SPS receiver can be based on a temporal length of a transmission by the transmitter. The RAT can be a wireless wide area network (WWAN). The controller can be integrated onto a same integrated circuit die as either the SPS receiver or the transmitter.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
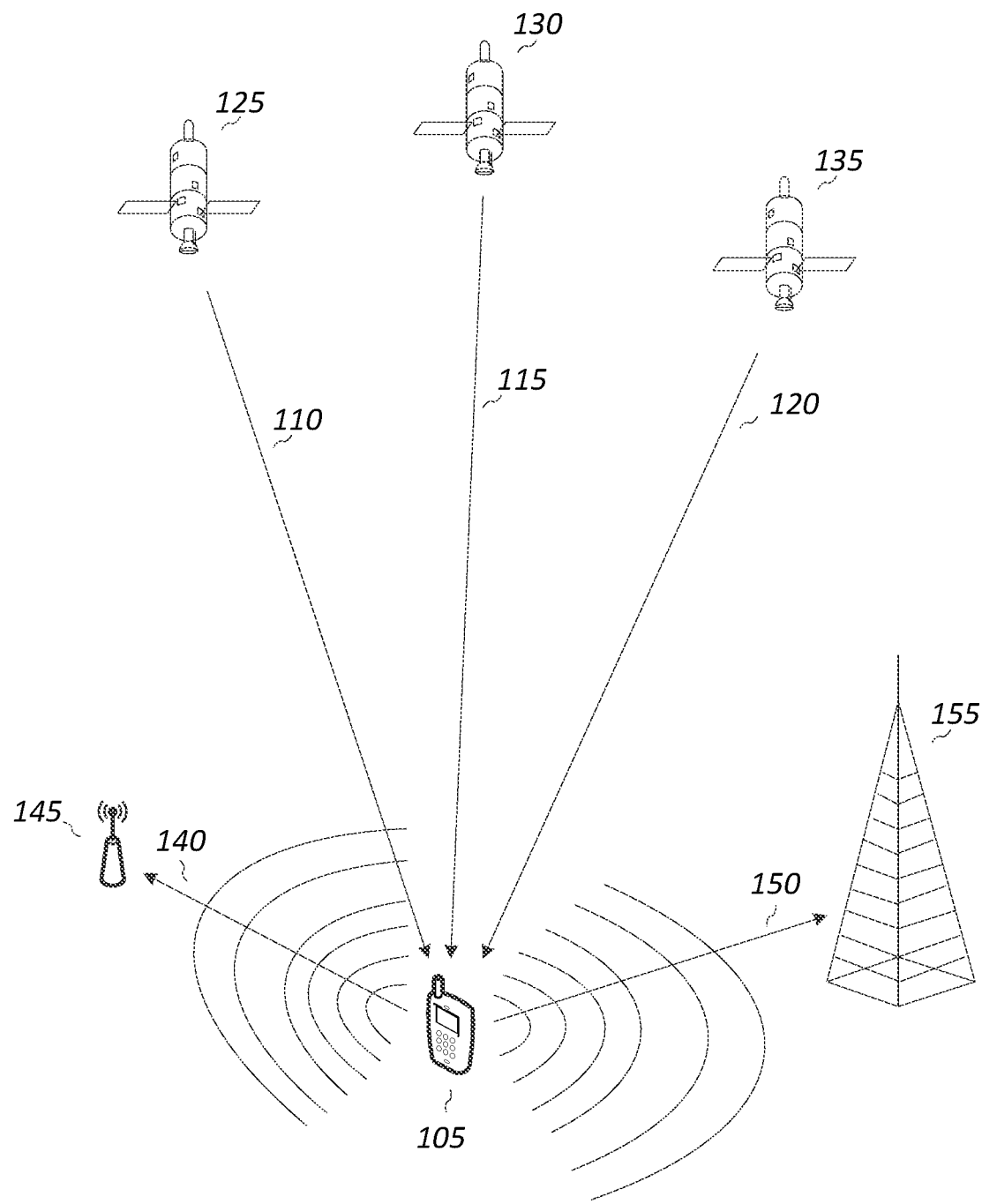
FIG. 1 illustrates a simplified diagram of a system that may incorporate one or more embodiments including satellite location aspects.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

IoT devices are becoming increasingly prevalent and can enable internetworked (e.g., smart) functionality in a variety of consumer electronic devices. IoT devices can include commodity or other consumer electronics that place increasing demands on device costs due to, for example, price-conscious consumer demands. Consequently, costs to design and implement IoT features, including component costs, can be of relatively high importance as compared to other mobile communication devices (e.g., smartphones, laptops, tablets, etc.).

Some features of IoT devices can be enabled through the use of an SPS receiver (such as a Global Navigation Satellite System (GNSS), for example) used in conjunction with a RAT transmitter or transceiver. For example, certain IoT devices can include a GNSS receiver for use with an LTE or other transmitter to enable wireless communication functionality of the IoT device. In these configurations, the use of the GNSS receiver in conjunction with the RAT transmitter can lead to several design challenges. For example, use of the RAT transmitter can impede use of the GNSS receiver if, for example, the amount of electromagnetic energy produced by the RAT transmitter interferes with location signal(s) received by the GNSS receiver for location determination purposes. For example, a signal transmitted via the RAT transmitter can attenuate a signal received by the GNSS receiver. The attenuation can prevent the GNSS receiver from locating the device.

Several techniques can be used to enable concurrent use of a GNSS receiver and a RAT transmitter. For example, filtering, switching, or other diplexer components can be used to physically remove or significantly reduce leakage or interference induced by RAT transmission signals from attenuating GNSS signal(s) for a GNSS receiver. Use of these components can add to the cost of a bill of materials for a device by requiring additional physical components to be integrated into the device. Therefore, use of these components can increase the cost of a device and/or reduce profit margins for a device. Thus, use of filtering components that enable concurrent use of a GNSS receiver with a RAT transmitter can have undesirable consequences, especially when incorporated into IoT devices.

Disclosed herein are techniques for managing use of a GNSS receiver in conjunction with one or more RAT transceivers. The techniques can operate without use of potentially costly hardware components to physically filter, diplex, and/or separate GNSS receiver location signals from RAT transmission signals. In certain embodiments, a controller (i.e., coexistence manager) can be configured to manage use of a GNSS receiver and a RAT transmitter. The GNSS receiver and the RAT transmitter can be separate and distinct components or be integrated into a single component (such as an integrated circuit). The controller can be integrated into either the GNSS receiver or the RAT transmitter, for example.

The controller can include functionality to independently resolve contentions between use of a GNSS receiver and RAT transmitter of a device. For example, the controller can be added to and/or supplement existing functionality of an IoT device. The controller can include one or more rules for determining priority between GNSS receiver and RAT transmitter operation. On or more antenna element(s) can be commonly shared between a RAT transmitter and a GNSS receiver or they can be physically distinct elements. It should be understood that transmissions to or from a GNSS receiver or RAT transmitter can couple onto physically distinct antenna elements. Transmissions from a first antenna element physically coupled to a RAT transmitter can impact transmissions received by a GNSS receiver on a second antenna element physically coupled to the GNSS receiver. The antenna elements can form part of an integrated circuit, a device housing, or other component of the device (e.g., the antenna element does not have to be a distinct component). The controller can include one or more rules to determine selective or concurrent operation of a GNSS receiver or RAT transmitter. The rules can be hard coded (e.g., via switches, configuration pins, or other) and/or soft coded (via processor executable instructions). In certain embodiments, the rules can include historical information to improve or otherwise alter prioritization of GNSS receiver vs. RAT transmitter operation.

In certain embodiments, the controller can manage access to an antenna element by sequentially powering and/or enabling GNSS and RAT functionality. For example, a GNSS receiver and a RAT transmitter can be selectively powered such that only one of the receiver or transmitter is active during a given time period. This time splicing of operation can avoid use of filtering or other hardware components for enabling full duplex usage of a GNSS receiver and a RAT transmitter.

In certain embodiments, a technique referred herein as "blanking" can be used to manage GNSS receiver and RAT transmitter usage. Blanking is a technique wherein both a GNSS receiver and RAT transmitter can be powered simultaneously, but the GNSS receiver prevented for receiving locating signal(s). Blanking can be enabled through additional functionality of a GNSS receiver. For example, the GNSS receiver can include functionality that, when enabled, configures the GNSS receiver to ignore electromagnetic signals received via an antenna element. The blanking functionality can include disconnecting or otherwise ignoring input from, for example, an analog to digital converter coupled to an antenna element. Blanking functionality can be enabled via a hardware signal, such as a discrete signal or via a serial message from a controller (such as the aforementioned controller), for example. Blanking can enable a GNSS receiver to be configured to ignore signals in relatively less time as compared to, for example, cycling power to the GNSS receiver or physically disconnecting the GNSS receiver from an antenna element. However, cycling power to a GNSS receiver may provide power savings advantages over blanking wherein the GNSS receiver may still be powered albeit in a relatively low power state.

Use of IoT devices may present certain differing usage cases as compared to other, more fully featured, wireless communication devices (such as smartphones, laptops, or tablets). As a generality, IoT devices may prioritize GNSS reception over RAT transmission. For example, a GNSS receiver may take precedence over a RAT transmission of an IoT device. Other, more fully featured device, such as smartphones and like devices may instead prioritize RAT operation. For example, a smartphone may prioritize data transfer or communication transmissions as compared to GNSS operation. An IoT device may, in contrast, place a higher priority on determining a location of the IoT device so that the location information can be transmitted via a RAT transmission. For example, certain IoT devices may only perform one of a limited number of functions. One of these functions may be determining a location of the IoT device and reporting the location information via a RAT transmission. As such, it may be advantageous for an IoT device to delay transmission of information until a location is determined via use of a GNSS receiver.

As another example, an IoT device may operate as a "slave" device wherein permission to transmit via a RAT transceiver may be dictated by an external "master" device. The master device may assign certain periods and/or channels that the IoT device is allowed to transmit RAT signals. For example, a server may coordinate operation of several IoT devices that may operate with similar frequency, channel, protocol, or other transmission attributes. Transmissions from one of the IoT devices may interfere with transmissions from a second one of the IoT devices. The server may prevent such interference by coordinating transmission between each of the IoT devices. The coordination can include providing each of the IoT devices a time period wherein the device is allowed to transmit RAT signal(s). The time periods may be non-overlapping between IoT devices to prevent interference between devices. Various frequencies, channel, or other transmission information may also be coordinated and/or dictated by the server or other master device.

As another example, use of GNSS receiver functionality can be relatively random as compared to other devices. An IoT device can be implemented as a "slave" device wherein the IoT device is configured to responds to requests from an external "master" device. For example, an IoT device may receive a command from an external device to provide the IoT device's location via a RAT transmission, for example. Thus, instead of being commanded to initiate location services (which may include locating via a GNSS receiver) by an internal process or operating system, an IoT device may instead respond to requests from an external master device. In a smartphone, for example, a same controller can be configured to manage location services and RAT transmissions and, therefore, may orchestrate usage of transceiver(s) accordingly. In an IoT device, an internal controller may have limited insight into timing and order of location and data transmission requests and, instead, may react to such requests from an external controller.

As a controller (such as a coexistence manager) of an IoT device reacts to data transmission and/or GNSS locating requests, the controller and/or GNSS receiver can include functionality to enable the GNSS receiver to dynamically adapt to the requests. For example, the GNSS receiver can include functionality to variably blank reception of locating signals for a variable amount of time, at a variable duty cycle, etc. This functionality can enable, for example, a GNSS receiver to expeditiously react to relatively random requests (random in duration, for example) to blank reception of location signals.

A controller for managing GNSS and RAT functionality can also include features to selectively power a GNSS receiver. For example, an IoT device can operate in cycles wherein data transmissions are receptions are each assigned a budget of a duty cycle. When it is determined that a particular RAT transmission may exceed a determined cycle length, the controller can power down a GNSS receiver (as opposed to blanking, for example) in anticipation that the GNSS receiver can be powered on and be operable to receive signals at a later time. In certain embodiments, a GNSS receiver can be configured to selectively power down, be commanded to an idle state, and/or blank reception of signals depending on timing or other characteristics of a RAT transmission.

In certain embodiments, an IoT device can include functionality to detect and determine an amount of interference from a RAT transmission, as well as determine whether the interference is sufficient to prevent a GNSS receiver from detecting locating signals. Depending upon, for example, a distance between an IoT device and a station, RAT transmission strength can be adjusted to conserve power. If an IoT device is relatively close to a station, the RAT transmission can operate at a relatively lower transmission power strength without significant degradation of the resulting over-the-air signal before it reaches the station. A requested signal transmission strength may also or alternatively be determined from a signal strength of a signal received from a station (e.g., a signal received from a station at high strength may indicate that a relatively low power transmission is needed to reach the station). An IoT device can measure a signal strength of transmissions from a RAT transmitter and/or a commanded power level of a RAT transmission to determine if the transmissions are sufficient in strength to impede operation of a GNSS receiver. If so, the controller can use techniques disclosed herein to prevent the GNSS receiver from attempting to receive locating signals.

FIG. 1 illustrates a simplified diagram of an environment 100 in which reception of Signal Positioning System (SPS) signals by the mobile device may be desensed during transmission of wireless signals by the mobile device. The term Satellite Positioning System (SPS) is used herein to refer to various types of satellite positioning systems, including different Global Navigation Satellite Systems (GNSS). For example, the SPS system may be a Global Positioning System (GPS), Global Navigation Satellite System (GLONASS), Galileo, Beidou, and/or other type of satellite positioning system. In general, the SPS system may be one or more of these different types of systems used either alone or in conjunction with one another. As shown, environment 100 includes a mobile device 105. Mobile device 105 may be a device designed to perform numerous functions, including the ability to determine its own location based on the reception of SPS signals from satellites.

Mobile device 105 is able to perform satellite-based positioning by receiving SPS signals from one or more satellites. Such satellite-based positioning techniques are well-known and only briefly described below. As shown here, mobile device 105 receives SPS signals 110, 115, and 120 from satellites 125, 130, and 135, respectively. Typically, each of the SPS signals 110, 115, and 120 would include timing information relating to when the SPS signal was transmitted from the respective satellite. Each SPS signal may also include ephemeris information which can be used to determine the location of the satellite at the time the SPS signal is transmitted. Mobile device 105 is able to determine when it receives each of the SPS signals 110, 115, and 120. The transmission time and reception time of each SPS signal may be aligned on a common timing reference, such as a common clock, known to the mobile device 105.

By taking the difference between the reception time and transmission time, mobile device 105 may compute the "flight time" associated with each SPS signal, for it to travel from the respective satellite to mobile device 105. The flight time can then be used to compute the distance between each satellite and mobile device, taking into account the speed of light. Once the distance between each satellite and the mobile device is found, trilateration may be used to compute the location of mobile device 105, based on the known location of each satellite and the distance between each satellite and mobile device 105.

In addition to satellite-based positioning, a significant category of functions performed by mobile device 105 relates to wireless communications. Wireless communications may serve as an important link in connecting mobile device 105 over private and/or public networks with other devices such as servers and other user equipment. This may include communication over various types of wireless networks, including wireless local area networks (WLAN) and wide area networks (WAN), among others. Examples of WLANs may be different types of Wi-Fi networks, such as those implemented based on various 802.11 standards. The example in FIG. 1 focuses on wireless communications between mobile devices and base stations. However, other examples of wireless communications may include peer-to-peer communications between mobile devices such as Wi-Fi Direct, Long-Term Evolution (LTE) Direct, etc. Examples of WWAN RATs may include LTE, wideband code division multiple access (WCDMA), and the like. Additional examples of wireless communications may include near field communications (NFC), Bluetooth communications, etc. Embodiments of the present invention, including selection of radio access technologies (RATs) and/or control of transmission of wireless signals to avoid "desensing," may be implemented with different types of wireless communication signals.

In the example shown in FIG. 1, mobile device 105 is able to perform wireless communications by sending signals to, and receiving signals from, one or more base stations 155. For instance, mobile device 105 may send a communication signal 140 to an access point 145, which may be a base station supporting LTE communications. Mobile device 105 may send a communication signal 150 to cell tower 155, which may be a base station supporting LTE communications. For instance, signal 140 and/or signal 150 transmitted by mobile device 105 may include an HTTP request for a web page the user of mobile device 105 may wish to retrieve from the Internet. Not shown in FIG. 1 are the wireless signals that mobile device 105 may receive back in response to the request. For example, such signals may be sent to mobile device 105 from access point 145 and/or cell tower 155 and may include an HTTP response containing the HTML file constituting the requested web page. FIG. 1 highlights the wireless signals transmitted from mobile device 105 (as opposed to wireless signals received by mobile device 105), because various embodiments of the present invention addresses techniques to control the scheduling of wireless signal transmissions from the mobile device, to reduce interference caused by such transmitted signals.

For example, if mobile device 105 simultaneously attempts to receive SPS signals such as 110, 115, and 120 and transmit wireless signals such as 140 and 150, interference may occur to "desense" the proper reception of the SPS signals. This can occur if received SPS signals 110, 115, and 120 and transmitted wireless signals 140 and 150 utilize common or overlapping frequencies. The interference may also be caused by spectral emissions from adjacent or close frequency bands. This can also occur even when received SPS signals 110, 115, and 120 and transmitted wireless signals 140 and 150 do not utilize common or overlapping frequencies, but intermodulation products introduce interference.

As mentioned previously, interference can occur when mobile device 105 attempts to simultaneously transmit wireless signals (e.g., one or more LTE signals) and receive SPS signals (e.g., GNSS signals). This can result if the wireless signals and the SPS signals utilize common or overlapping frequencies. Interference can also result if the wireless signals and the SPS signals do not utilize common or overlapping frequencies, but intermodulation products (IM) introduce interference. As an example, a GNSS transceiver may operate on 1.5/1.6 GHz frequency band. Therefore, the following IM products may result from concurrent operation of SPS and communication transceivers:

(A) Long term evolution (LTE) B13/B14 (777-798 MHz uplink), second harmonics falls in the GNSS band (e.g., 2×780 MHz=1600 L1).

(B) 800 MHz WWAN and 2.4 GHz WLAN, second order IM product (IM2) falls at 1.6 GHz (e.g., 2.4 GHz-800 MHz), (C) 1.7/1.9 GHz WWAN and 5 GHz WLAN, third order IM product falls at 1.6 GHz (e.g., 5 GHz-2×1.7 GHz), As can be seen, even though WLAN signals at 2.4 GHz or 5 GHz and WWAN signals at 800 MHz or 1.7/1.9 GHz may not necessarily utilize the same frequency as GNSS signals at 1.5/1.6 GHz, it is possible for IM products resulting from the mixing of such WLAN and WWAN signals to land in the same frequencies utilized by GNSS signals. Such IM products may thus interfere with and "desense" the proper reception of the GNSS signals. Two of the above examples show IM products resulting from the transmission of signals belonging to different RAT transceivers. The first example shows that interference (e.g., harmonics, IM products) result from the transmission of signals belonging to the same type of system (e.g., LTE only). In general, interference on the GNSS signals may result from transmission of signals belonging to one or more RAT transceivers.

In general, many factors may affect whether a RAT transceiver's transmissions cause substantial interference with the reception of GNSS signals by a GNSS receiver. In some situations, the frequency being used by the RAT transceiver may cause little or no interference with the GNSS receiver. In some situations, the RAT transceiver may be transmitting at a low enough power that the RAT transceiver may cause little or no interference with the GNSS receiver. In other situations, the RAT transceiver's spectral emissions or harmonics may cause interference with the GNSS receiver. When multiple RAT transceivers of a device are transmitting at a same time, various harmonic and/or intermodulation frequencies may be created that can cause interference with the GNSS receiver (as shown above).

Certain embodiments describe techniques to closely coordinate GNSS and RAT operation to mitigate or eliminate the impact of radio transmissions (RFI) within a device on GNSS operation. Current systems are designed such that the GNSS receiver reacts to the RAT transmission issues. For example, if there is strong interference in the GNSS L1 band, the GNSS receiver switches to the GNSS L2 band. In another example, the system may artificially limit a RAT transmission duty cycle to reduce interference on the GNSS receiver. However, for an IoT device which may be required to randomly transmit RAT messages, as disclosed herein, artificially limiting a RAT transmission duty cycle may not be able to support initiation times for relatively immediate transmittal of a message in response to a randomly received request for transmittal. Another scheme is to blank the GNSS receiver when other transceivers in the device are transmitting.

In certain embodiments, a coexistence manager prioritizes access requests to a GNSS receiver and a RAT transceiver. In certain embodiments, RAT control is performed to protect GNSS receiver from interference. For example, reverse messaging can be sent by a coexistence manager (CxM) to the Connectivity Engine (CnE) or a high level OS (HLOS) to change the priority of radios (e.g., pick WLAN vs. WWAN) for the purpose of GNSS protection.

Figure 2:
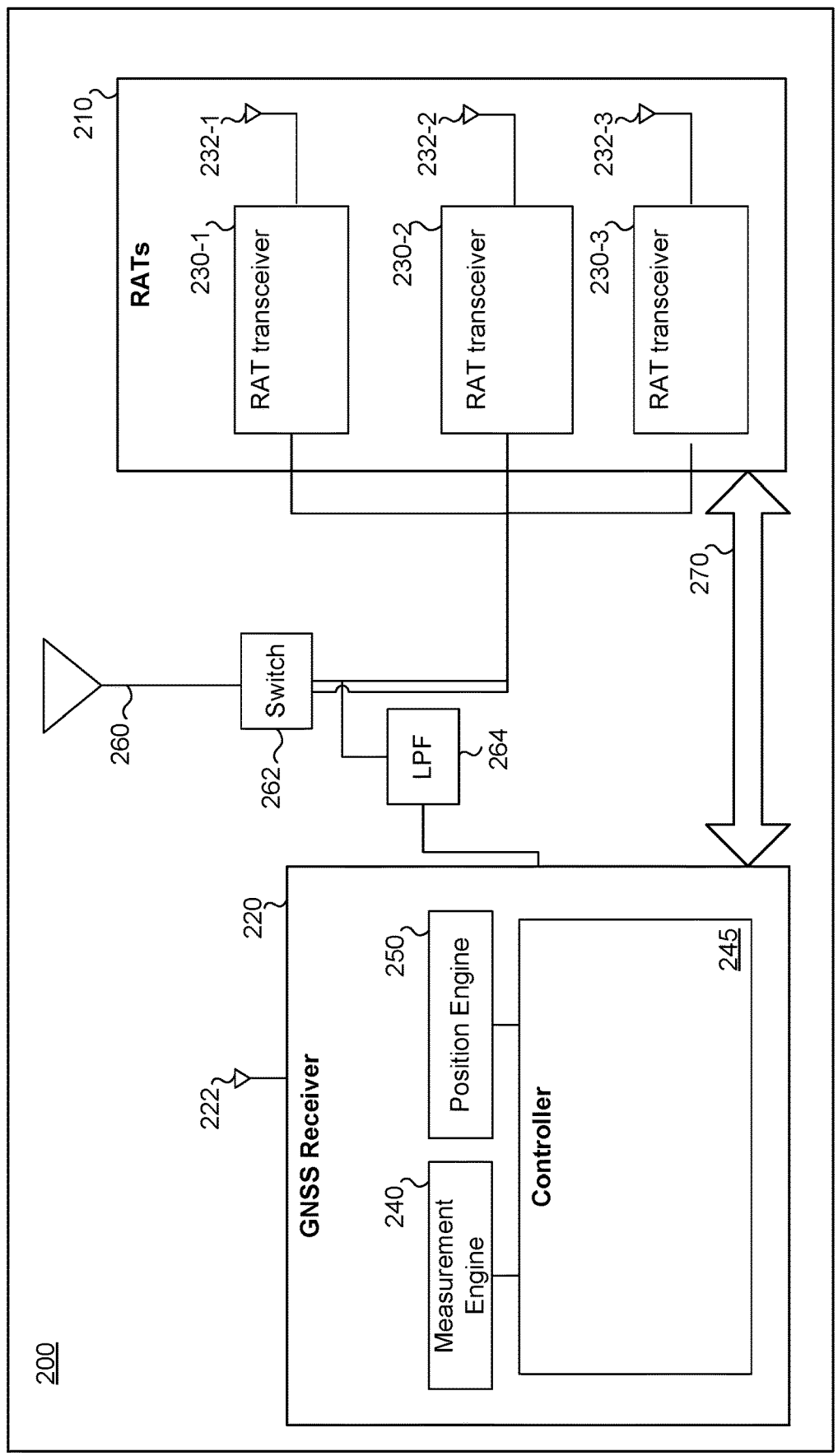
FIG. 2 illustrates a simplified diagram of a system that may incorporate one or more embodiments including a GNSS receiver and a RAT transmitter.

FIG. 2 illustrates an exemplary embodiment of a device 200, in which a GNSS receiver 220 and/or one or more RAT transceivers 210 are used in conjunction in a device to enable full duplex communication of the GNSS receiver and the RAT transceivers. Device 200 may include: GNSS receiver 220, RATs transceivers 210, communication interface 250, and antennas 222, 232-1, 232-2, 232-3, and 260.

As illustrated, RATs 210 include three RAT transceivers 230-1, 230-2, and 230-3. Some or all of RAT transceivers 210 may be configured to receive commands from and/or transmit data to GNSS receiver 220. Some or all RAT transceivers 210 may include controller functionality and may be configured to provide a controller (not shown) with information about one or more upcoming transmissions.

The information (which may be referred to as a characteristic) about the one or more upcoming transmissions may include: the time of the start of the transmission, end time of the transmission, and/or time window (also referred to as the time period) of the transmission; an indication of the RAT; the frequency of the transmission; and/or the power level of the transmission. Some or all RAT transceivers 210 may be configured to receive commands from GNSS receiver 220.

GNSS receiver 220 can include: measurement engine 240 and position engine 250, controller 245. A measurement engine 240o can process timing data received via an antenna element 260 from multiple satellites of one or more global navigation satellite systems. Based on the received timing data, correlators can be used to determine timing information by the measurement engine. Based on the calculated timing information using the correlators, a pseudorange can be determined by measurement engine 240.

The pseudorange calculations made by measurement engine 240 can be output (e.g., to another component, an application being executed, or a high-level operating system) and/or may be passed to position engine 250. Position engine 250, based on the pseudorange calculations from measurement engine 240, may determine a location of GNSS receiver 220 in the form of coordinates. These coordinates may be provided to an application and/or high level operating system being executed by a host processor for use as a location of GNSS receiver 220 or, more generally, as the location of the device 300, such as a cellular phone or tablet computer, or the like.

The device 200 of FIG. 2 includes an antenna element 260 coupled to GNSS receiver 220 and each of RAT transceivers 210. Antenna element 260 can be coupled to a housing of a device, be a discrete component, be distributed across several components, and/or can be integrated within a transceiver, receiver, and/or transmitter. Antenna element 260 can be operable to emit a radio frequency transmission from both or for each of GNSS receiver 220 and/or each of RAT transceivers 210. To enable full duplex operation of GNSS Receiver 220 and (e.g., concurrently with) RAT transceivers 210, several hardware components may be used to desensitize GNSS Receiver 220 from transmissions from RAT transceivers 210 (e.g., LTE transmissions). For example, a filter 264 can be used to filter low band $2^{nd}$ harmonic frequencies of LTE transmissions (or other RAT transmissions/components) from unduly attenuating signals received by GNSS Receiver 220 used to locate device 200. Filter 264 can also include a notch filter, for example, to filter LTE mid band frequencies from impacting GNSS Receiver 220 operation. A switch 262 can also be included within device 200. Switch 262 can include, for example, a reed relay or like device to physically separate antenna element 260 from one or more of GNSS receiver 220 and each of RAT transceivers 210. The components 262 and 264 can be implemented as hardware components within device 200 and thus may add to a cost to manufacture device 200, power requirement to operate device 200, or other. If device 200 is an IoT device, this additional cost and/or power usage may be undesirable as disclosed herein.

In certain embodiments, each of RAT transceivers 210 may be associated with a respective corresponding antenna. RAT transceiver 230-1 may use antenna 232-1 to transmit and/or receive wireless signals; RAT transceiver 230-2 may use antenna 232-2 to transmit and/or receive wireless signals; and RAT transceiver 230-3 may use antenna 232-3 to transmit and/or receive wireless signals. In some embodiments, two or more RAT transceivers of RAT transceivers 210 may share a single antenna. One or more RAT transceivers of RAT transceivers 210 may transmit using two or more antennas. A RAT transceiver of RAT transceivers 210 may be permitted to switch transmission from a first antenna to a second antenna. In some embodiments, it may also be possible that GNSS receiver 220 may share an antenna with one or more RAT transceivers 210. GNSS receiver 220 may also include a standalone antenna 222 that is distinct from an antenna used by a RAT transceiver 210. Although not illustrated, each of antennas 222, 232-1, 232-2, or 232-3 can be coupled to a respective one or more filtering elements (such as filter 264), switch elements (such as switch 262), or other to reduce or inhibit noise from RAT transmissions or other sources, as disclosed herein.

Figure 3:
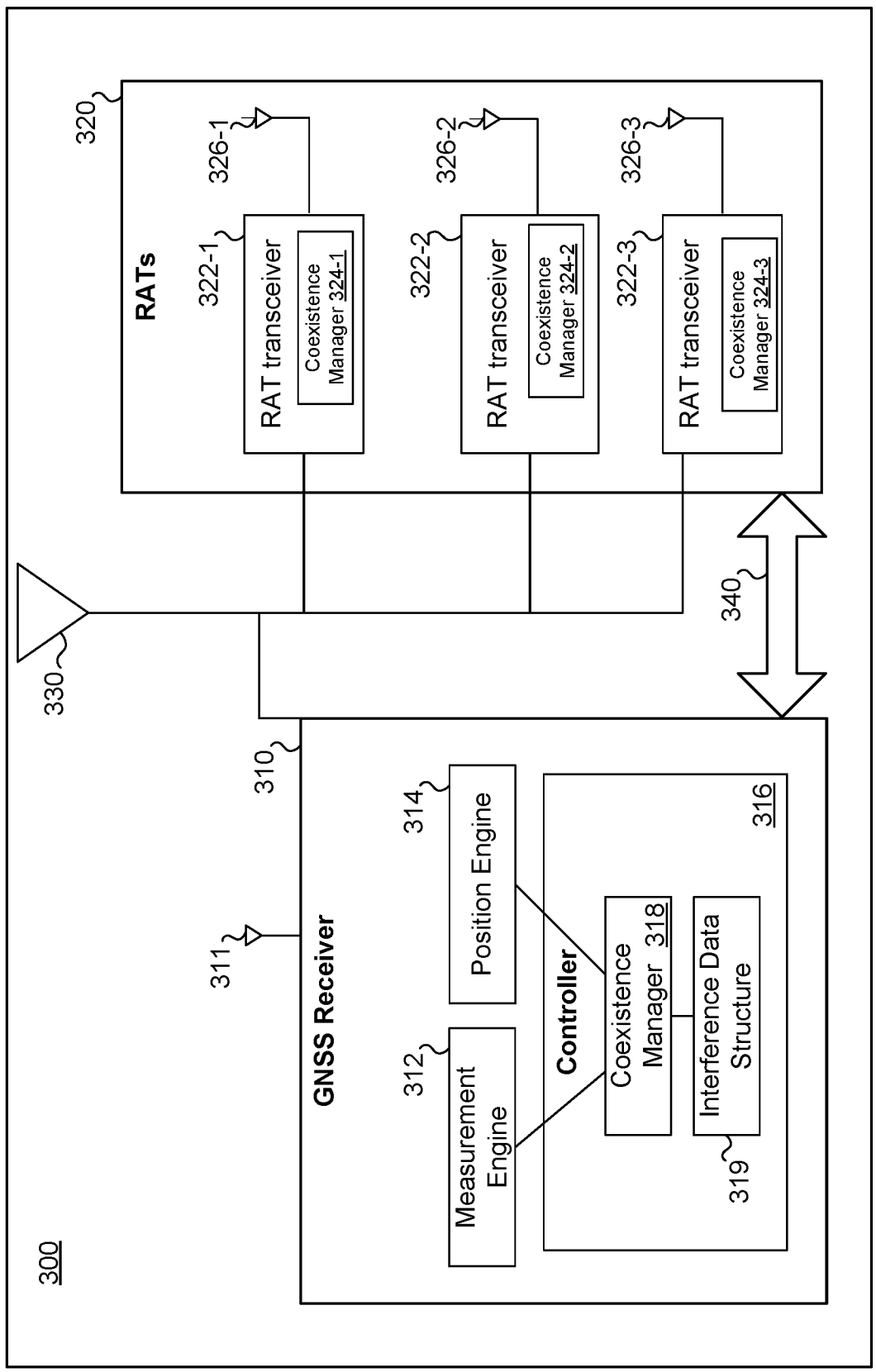
FIG. 3 illustrates a simplified diagram of a system that may incorporate one or more embodiments including a GNSS receiver and a RAT transmitter without use of antenna filtering components.

FIG. 3 illustrates an exemplary embodiment of a device 300, in which a GNSS receiver 310 and/or one or more RAT transceivers 320 are used in conjunction in a device to enable half duplex communication of the GNSS receiver and the RAT transceivers without need of filtering or switching device for common antenna element 330 (or antennas 326-1, 326-2, and/or 326-3). In certain embodiments, a RAT transceiver 320 can operate in a half duplex mode for transmitting and receiving signals. In certain embodiments, a GNSS receiver 310 can operate in a half duplex mode in conjunction with transmissions from a RAT transceiver 320 (or transmitter). In certain embodiments, a GNSS receiver 310 can operate simultaneously when a RAT transceiver 320 is operating in a reception mode. Device 300 may include: GNSS receiver 310, RATs transceivers 320, antenna 330, and communication interface 340. GNSS receiver can be similar to GNSS receiver 220. RAT transceivers 320 can be similar to RAT transceivers 210. Device 400 may also include antennas 311, 326-1, 326-2, and/or 326-3.

As illustrated, each of RAT transceivers 322-1, 322-2, 322-3, and GNSS receiver 310 can share a common antenna element 330 for respective transmission and/or reception of radio frequency signals therefrom. One or more of the RAT transceivers 320 may include a coexistence manager 324. For example, RAT transceiver 322-1 may include coexistence manager 324-1, RAT transceiver 322-2 may include coexistence manager 324-2 and RAT transceiver 322-3 may include coexistence manager 324-3. It should be understood that, in other embodiments, fewer or greater numbers of RAT transceivers, antennas and/or coexistence managers may be present. Coexistence managers can operate as controllers to manage use of antenna 300 by RAT transceivers 320 and GNSS receiver 310.

Some or all of RAT transceivers 320 may be configured to receive or transmit commands and/or transmit data to GNSS receiver 3100. Some or all RAT transceivers 320 may be configured to provide GNSS receiver 310 with information about one or more upcoming transmissions. Each of RAT transceivers 320 can be configured to command GNSS receiver to power on and operate, power off, enter a standby mode, and/or blank reception of locating signals via antenna element 330 or antenna 311.

These commands and/or data can include a time to start reception of locating signals, an end time to stop reception of locating signal, a time window (also referred to as the time period) of reception, a duty cycle for ignoring reception of locating signals in a cyclic fashion, or other. These commands/data can be passed via a common messaging protocol, via a dedicated hardware signal, or other.

GNSS receiver 310 can include: measurement engine 312, position engine 314, and controller 316. Controller 316 can include coexistence manager 318 and interference data structure 319. Measurement engine 312 can be similar to measurement engine 240. Position Engine 314 can be similar to positioning engine 250.

Coexistence manager 318 may be part of a controller 316 of GNSS receiver 310. In addition to performing other functions, controller 316 may perform the functions of coexistence manager 318. Coexistence manager 318 can serve to manage a GNSS-based location determination such that a location of GNSS receiver 220 can be determined while operation events are occurring at one or more RAT transceivers 320.

Coexistence manager 318 can be configured to maintain an interference data structure 319 that can indicate an amount of interference experienced by GNSS receiver 310 when various RAT transceiver operating events are occurring. For instance entries may be created and periodically updated in interference data structure 319 that classifies specific operating events at RAT transceivers 320. Entries may be maintained not only for operating events of specific RAT transceivers of RAT transceivers 320, but also for combinations of multiple RAT transceivers of RAT transceivers 320. Such combinations can be used to determine additional interference caused by intermodulation effects that can occur when two or more RAT transceivers 320 are transmitting at a same time. Interference data structure 319 may maintain information about the amount of interference received by GNSS receiver 310 when a RAT transceiver is transmitting at specific frequencies and/or specific power levels. Interference data structure 319 may also maintain information about the amount of interference received by GNSS receiver 310 for other forms of operating events performed by RAT transceivers 320 besides transmit events. For instance, receive events may also cause an amount of interference to be experienced by GNSS receiver 310.

Although not illustrated, each of coexistence managers 324-1 through 324-3 can include an interference data structure. Used in conjunction with a coexistence manager of a RAT transceiver, an interference data structure can be used to record transmission parameters of one or more RAT transceivers 320. For example, a transmission signal strength can be determined and recorded within an interference data structure. The signal strength can indicate an amount of interference that may be imparted into antenna element 330 during transmission by a respective RAT transceiver. In certain embodiments, an interference data structure can be shared by two or more RAT transceivers 320. Also, not shown can be an interface component (e.g., analog to digital converter, switch, etc.) that can be used to couple an antenna to GNSS receiver 220 and/or a RAT transceiver 340. The interface components can be implemented within a same integrated circuit as GNSS receiver 220 or RAT transceiver 340. During blanking, for example, a GNSS receiver 220 can configured interface components to dissociate the GNSS receiver from antenna 230, for example.

In certain embodiments, each of RAT transceivers 320 may be associated with an antenna. RAT transceiver 322-1 may use antenna 326-1 to transmit (and, possibly, receive) wireless signals; RAT transceiver 322-2 may use antenna 326-2 to transmit (and, possibly, receive) wireless signals; and RAT transceiver 322-3 may use antenna 326-3 to transmit (and, possibly, receive) wireless signals. In some embodiments, two or more RAT transceivers of RAT transceivers 320 may share a single antenna. Also, one or more RAT transceivers of RAT transceivers 320 may transmit using two or more antennas. A RAT transceiver of RAT transceivers 320 may be permitted to switch transmission from a first antenna to a second antenna. In some embodiments, it may also be possible that GNSS receiver 310 may share an antenna with one or more RAT transceivers 320. GNSS receiver 310 may also include a standalone antenna 411 that is distinct from an antenna used by a RAT transceiver 320.

Figure 4:
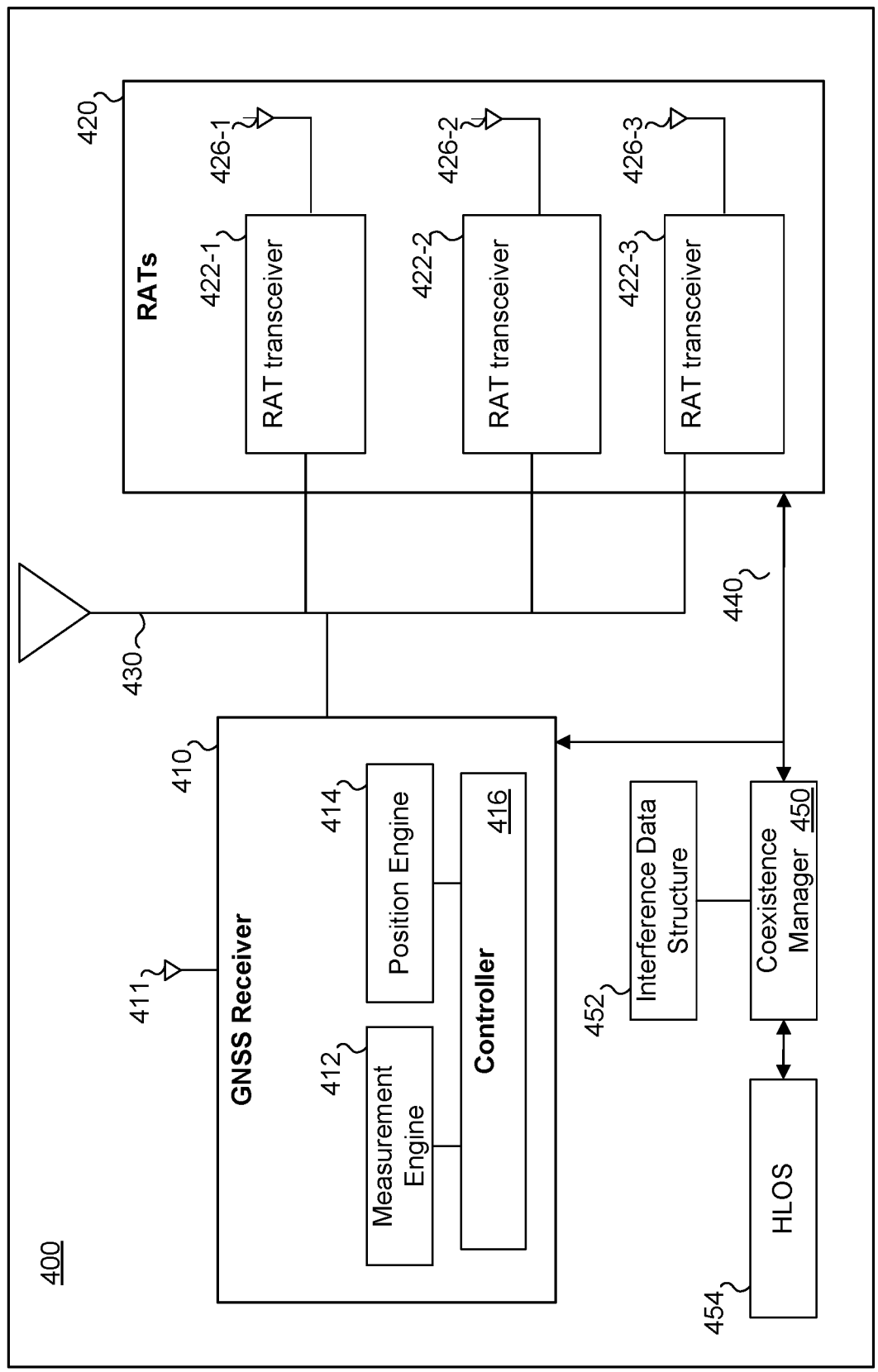
FIG. 4 illustrates a simplified diagram of a system that may incorporate one or more embodiments including a GNSS receiver and a RAT transmitter through use of a shared coexistence manager.

FIG. 4 illustrates an embodiment of a device 400 having a coexistence manager separate from a GNSS receiver or RAT transceiver, according to certain embodiments of the present disclosure. For instance, GNSS receiver 410 may reside on a first integrated circuit chip and the coexistence manager may reside on a second integrated circuit chip. System 400 may include: GNSS receiver 410, RATs 420, antenna element 430, coexistence manager 450, high level operating system (HLOS) 454, and communication interface 440. Device 400 may also include antennas 411, 426-1, 426-2, and/or 426-3.

Components of device 400 may function substantially similarly to device 300 of FIG. 3. For instance, coexistence manager 450 may perform all of the functions of coexistence manager 318. However, rather than the coexistence manager being part of GNSS receiver 310, coexistence manager 450 is separate. In some embodiments, coexistence manager 450 may be implemented as hardware or firmware. In some embodiments, coexistence manager 450 is executed by a host, which refers to a processor handling executing of a high level operating system. In some embodiments, coexistence manager 450 may be a stand-alone component (e.g., a separate controller) or may be incorporated into another component, such as a specialized or general-purpose processor.

Coexistence manager 450 may receive information about operating events (e.g., current or upcoming) from RATs 420 and may receive information from GNSS receiver 410 about a status of location determination. Coexistence manager 450 may receive information output by controller 416 of GNSS receiver 410 about received power levels of various GNSS locating signals. Coexistence manager 450 may receive information output from RATs 420 about transmitted power levels of various RAT transmissions. Coexistence manager 450 may maintain interference data structure 452 as detailed in relation to coexistence manager 319. Interference data structure 452 may be onboard coexistence manager 450 or may be stored in another location and accessible by coexistence manager 450. In some embodiments, interference data structure 452 may be maintained by controller 416 of GNSS receiver 410, for example.

Coexistence manager 450 can communicate with controller 426 of GNSS receiver 410 and RATs 420 via communication interface 440 (or via two separate communication interfaces). Such a communication interface may permit serial, parallel, or some other form of data transmission to occur among the components. In some embodiments, GNSS receiver 410 can receive data from and transmit data to coexistence manager 450 and RATs 420 can receive data from and transmit data to coexistence manager 450.

Coexistence manager 450 may communicate with a high level operating system (HLOS) 454 and/or one or more applications being executed by HLOS 454. HLOS 454 may instruct coexistence manager 450 whether preference should be given to location determination or to operating events of RATs 420. In certain embodiments, coexistence manager 450 can be operable to determine a priority between RAT and GNSS activities. For example, coexistence manager 450 can include one or more rules. Example rules that can be implemented include: always prioritizing one or more RAT transmissions over GNSS receptions, always prioritizing GNSS locating signal reception over RAT transmissions, or prioritizing a GNSS locating signal reception or a RAT transmissions based upon one or more parameters. These parameters can include information gathered from an external agent indicating a priority, information from prior prioritization of one transmission over another, a running tally of usage of a GNSS receiver or RAT transmitter, or other information.

In certain embodiments, a RAT transceiver can operate to transmit LTE signals, as disclosed herein. A specific transmission session of an LTE protocol can have a maximum active transmission period of 2.048 seconds. A minimum time period between active sessions can be 1 millisecond. A minimum time between two consecutive sessions can be 5 milliseconds. As disclosed herein, an IoT device may have limited forewarning as to an expected length of a transmission session. Instead, the IoT device may act to respond to requested from external agents. When a request is received by such an external agent, an IoT device may then only determine a length of transmission (or other information). Therefore, this information may only be obtained by an IoT device one or two milliseconds before an active transmission session is initiated. As such, an impact to a GNSS receiver's ability to determine a location of an IoT device may be randomly interfered depending upon when a request to transmit an LTE signal is received by an IoT device.

A controller, such as a coexistence manager described herein, can be operable to adjust GNSS operation to occur serially and exclusively from a RAT transceiver (such an LTE transceiver). Additionally or alternatively, a controller can be operable to command a GNSS receiver to blank reception of GNSS reception signals, as described herein. Given certain timing parameters of a RAT transmission (such as through provided herein regarding LTE transmission timings), a controller can be operable to intelligently prioritize serial powering, blanking of a GNSS receiver, or message content between the controller and GNSS receiver, for example.

In certain embodiments, a controller can determine whether an LTE transmissions is to have a duration of less than 6 milliseconds. If so then a blanking and/or powered down state of a GNSS receiver can be maintained during transmission of an LTE message. If the duration is greater than or equal to 6 milliseconds, the controller can additional send information to a GNSS receiver including the LTE transmission start time, duration, band, bandwidth, and/or transmission power. This information can be used by the GNSS receiver to determine if and when GNSS locating signals should be received. For example, the GNSS receiver may not receive locating signals for the duration of the LTE transmission. If the band and/or power parameters of the LTE transmission indicate that the transmission will not interfere with GNSS locating signal reception, the GNSS receiver may continue to receive locating signals. In certain embodiments, if a transmission duration is greater than 200 millisecond, the controller can send a notification after the transmission session is complete. Although LTE is used as an example, other RAT protocols can also be used using similar techniques.

A GNSS receiver can include functionality to support management of GNSS reception and RAT transmission(s). For example, a GNSS receiver can include functionality to determine of a GNSS measurement is "polluted." As used herein, a polluted GNSS measurement can indicate that the measurement may not be accurate do to interference from a RAT transmission. For example, a GNSS measurement period may be deemed to result in pollute measurements if the measurement period overlaps with a RAT transmission for greater than 1 millisecond. If a measurement is polluted, it can be flagged to not be used to determine a location of a device. If a RAT transmission session is longer than threshold period of time (200 milliseconds for LTE, for example), the GNSS receiver may idle itself. If a RAT transmission session is between 6 milliseconds and 200 milliseconds, for example, the GNSS receiver can blank reception of locating signals. If a transmission session is longer than 1 second, for example, the GNSS receiver can power itself off to further save power. Upon reception from a controller that a RAT transmission has completed, the GNSS receiver can power itself back on.

In certain embodiments, each of RAT transceivers 420 may be associated with an antenna. RAT transceiver 422-1 may use antenna 426-1 to transmit (and, possibly, receive) wireless signals; RAT transceiver 422-2 may use antenna 426-2 to transmit (and, possibly, receive) wireless signals; and RAT transceiver 422-3 may use antenna 426-3 to transmit (and, possibly, receive) wireless signals. In some embodiments, two or more RAT transceivers of RAT transceivers 420 may share a single antenna. Also, one or more RAT transceivers of RAT transceivers 420 may transmit using two or more antennas. A RAT transceiver of RAT transceivers 420 may be permitted to switch transmission from a first antenna to a second antenna. In some embodiments, it may also be possible that GNSS receiver 410 may share an antenna with one or more RAT transceivers 420. GNSS receiver 410 may also include a standalone antenna 411 that is distinct from an antenna used by a RAT transceiver 420.

Figure 5:
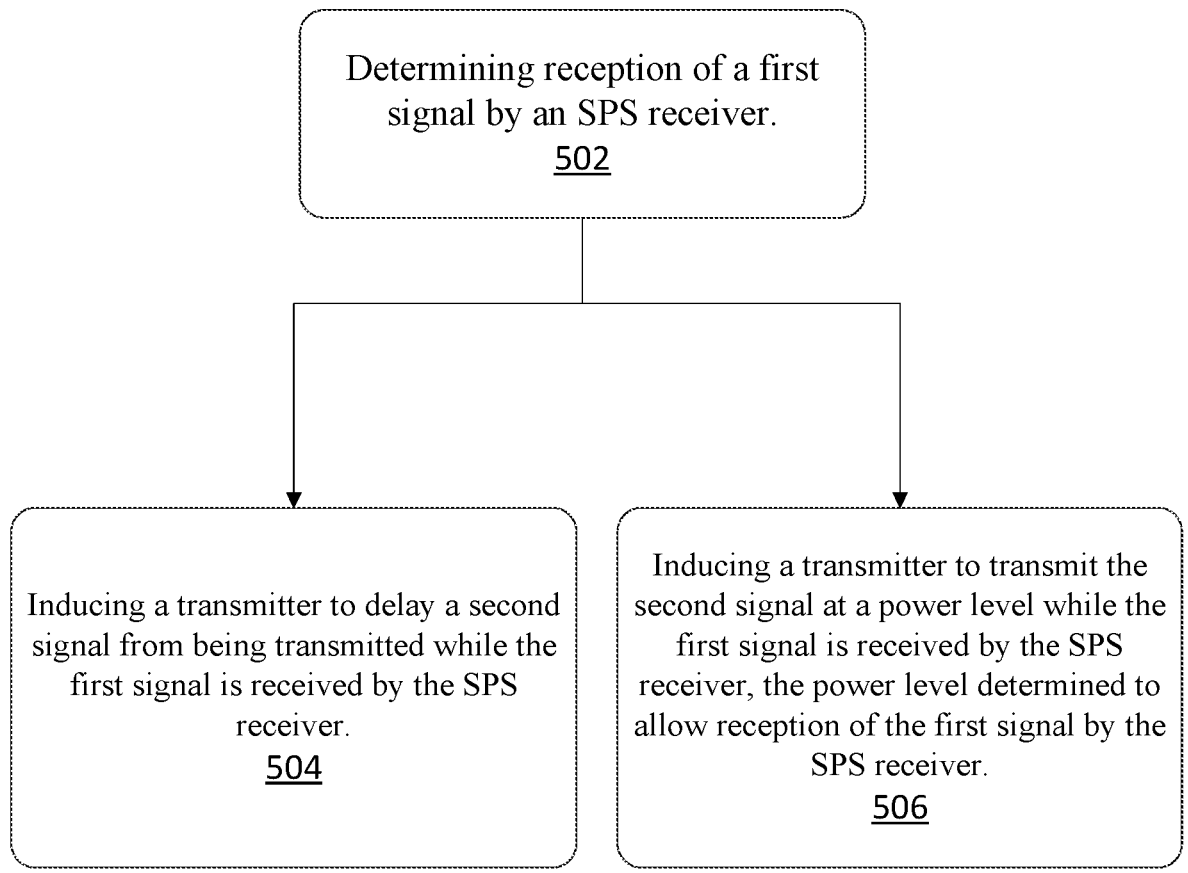
FIG. 5 illustrates a flowchart for implementing certain embodiments.

FIG. 5 illustrates a flowchart 500 for implementing techniques of the disclosure according to certain embodiments. At 502, a determination can be made if a first signal is received by an SPS receiver of device. The determination can be made by a controller (such as controller 316 or 416 or coexistence manager 450). The device can be device 200, 300, or 400. Depending on certain characteristics of the signal, a state of the device, or other criteria as disclosed herein, at 504, a transmitter can be induced to delay transmission of a second signal or, at 506, the second signal can be transmitted at a power level determined to allow reception of the first signal to enable locating of the device. In certain embodiments, a transmission can be delayed until a location is determined for the SPS receiver.

Figure 6:
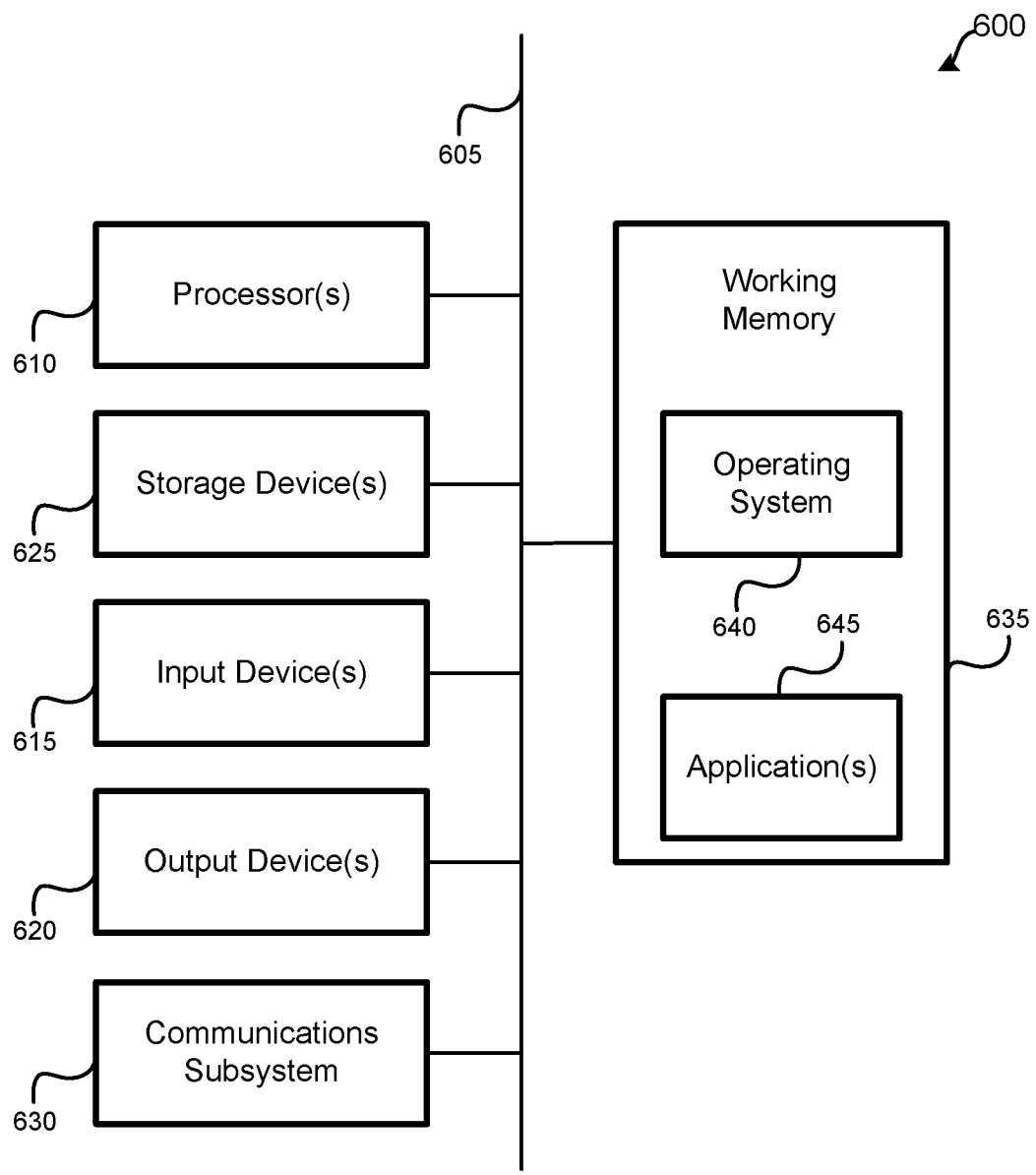
FIG. 6 illustrates an example of a computing system in which one or more embodiments may be implemented.

FIG. 6 provides a schematic illustration of one embodiment of a computer system 600 that can perform various blocks of the methods provided by various embodiments. A computer system as illustrated in FIG. 6 may be incorporated as part of the previously described computerized devices, such as devices 200, 300, and 500. For instance, functions of a coexistence manager may be performed by a general-purpose processor implemented as part of computer system 600. Further, devices 200, 300, and 500 may reside on a computerized mobile device, such as a tablet computer or cellular phone that contains computer system 600. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a keyboard, remote control, and/or the like; and one or more output devices 620, which can include without limitation a display device, a printer, and/or the like. As used herein, a controller can include functionality of a processor (such as processors 610).

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a Wi-Fi device, a WiMax device, cellular communication device, GSM, CDMA, WCDMA, LTE, LTE-A, LTE-U, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

A SPS typically includes a system of transmitters positioned to enable entities to determine their location on or above the Earth based, at least in part, on signals received from the transmitters. Such a transmitter typically transmits a signal marked with a repeating pseudo-random noise (PN) code. In a particular example, such transmitters may be located on Earth orbiting space vehicles (SV). For example, a SV in a constellation of Global Navigation Satellite System (GNSS) such as Global Positioning System GPS, Global Navigation Satellite System (GLONASS), etc. may transmit a signal marked with a PN code that is distinguishable from PN codes transmitted by other SVs in the constellation.

In accordance with certain aspects, the techniques presented herein are not restricted to global systems (e.g., GNSS) for SPS. For example, the techniques provided herein may be applied to or otherwise adapted for use in various regional systems, such as, e.g., Quasi-Zenith Satellite System (QZSS) over Japan, Indian Regional Navigational Satellite System (IRNSS) over India, etc., and/or various augmentation systems (e.g., an Satellite Based Augmentation System (SBAS)) that may be associated with or otherwise adapted for use with one or more global and/or regional navigation satellite systems. By way of example but not limitation, an SBAS may include an augmentation system(s) that provide integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Such SBAS may, for example, transmit SPS and/or SPS-like signals that may also be interfered with by certain wireless communication signals, etc. Thus, as used herein, an SPS may include any combination of one or more global and/or regional navigation satellite systems and/or augmentation systems, and SPS signals may include SPS, SPS-like, and/or other signals associated with such one or more SPS.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An apparatus, comprising:
   an antenna;
   a satellite positioning system (SPS) receiver coupled with the antenna;

a radio access technology (RAT) transmitter coupled with the antenna; and a controller communicatively coupled to the SPS receiver and the RAT transmitter, wherein the controller is configured to:

determine whether the SPS receiver is receiving a first signal via the antenna to determine a location of the SPS receiver; and in response to determining that the SPS receiver is receiving the first signal via the antenna, induce the RAT transmitter to either:

(a) delay a second signal from being transmitted by the RAT transmitter via the antenna while the first signal is being received by the SPS receiver via the antenna or the location of the SPS has not been determined; or (b) transmit the second signal at a low power level via the antenna while the first signal is received by the SPS receiver via the antenna, the low power level determined to allow reception of the first signal by the SPS receiver via the antenna, wherein the apparatus does not include a filter coupled between the antenna and each of the SPS receiver and the RAT transmitter to physically separate the first signal from the second signal.

2. The apparatus of claim 1, wherein the controller is further configured to select the low power level based on a determination of a strength of the second signal at a receiving station.

3. The apparatus of claim 2, wherein the controller is further configured to select the low power level based on at least one of: a distance between the apparatus and the station, or a degree of interference experienced by a prior signal transmitted by the apparatus and received at the station.

4. The apparatus of claim 1, wherein the controller is further configured to select the low power level based on a power level of a signal received from a station.

5. The apparatus of claim 1, wherein the controller is configured to induce the transmitter to:

delay the second signal from being transmitted while the first signal is received by the SPS receiver or a location of the SPS has not been determined; and not transmit the second signal while the first signal is received by the SPS receiver.

6. The apparatus of claim 1, wherein the controller is configured to induce the transmitter to:

transmit the second signal at the low power level while the first signal is received by the SPS receiver; and not delay the second signal from being transmitted while the first signal is received by the SPS receiver or a location of the SPS has not been determined.

7. The apparatus of claim 1, wherein the controller is configured to:

determine whether the transmission by the RAT transmitter is prioritized over the reception by the SPS receiver; and in response to determining that the transmission by the RAT transmitter is prioritized over the reception by the SPS receiver:

(1) induce the transmitter to transmit the second signal; and (2) blank the SPS receiver from deriving positioning information based on the reception, or power down the SPS receiver.

8. The apparatus of claim 7, wherein the determining of whether to blank the SPS receiver or power down the SPS receiver is based on a temporal length of a transmission by the transmitter.

9. The apparatus of claim 1, wherein the controller is integrated onto a same integrated circuit die as either the SPS receiver or the transmitter.

10. A method, comprising:

determining whether a SPS receiver is receiving a first signal via an antenna to determine a location of the SPS receiver; and in response to the determination that the SPS receiver is receiving the first signal via the antenna, inducing a RAT transmitter to either:

(a) delay a second signal from being transmitted by the RAT transmitter via the antenna while the first signal is received by the SPS receiver via the antenna and the location of the SPS has not been determined; or (b) transmit the second signal at a low power level via the antenna while the first signal is received by the SPS receiver via the antenna, the low power level determined to allow reception of the first signal by the SPS receiver via the antenna, wherein a signal path between the antenna and each of the SPS receiver and the RAT transmitter does not include a filter to physically separate the first signal from the second signal.

11. The method of claim 10, wherein the low power level is selected based on a determination of a strength of the second signal at a receiving station.

12. The method of claim 11, wherein the low power level is selected based on at least one of: a distance between the antenna and the station, or a degree of interference experienced by a prior signal transmitted by the antenna and received at the station.

13. The method of claim 10, wherein the low power level is selected based on a power level of a signal received from a station.

14. A non-transitory computer readable medium containing instructions that, when executed by one or more processors, cause the one or more processors to:

determine whether a SPS receiver is receiving a first signal via an antenna to determine a location of the SPS receiver; and in response to the determination that the SPS receiver is receiving the first signal via the antenna, induce a RAT transmitter to either:

(a) delay a second signal from being transmitted by the RAT transmitter via the antenna while the first signal is received by the SPS receiver via the antenna and the location of the SPS has not been determined; or (b) transmit the second signal at a low power level via the antenna, the low power level determined to allow reception of the first signal by the SPS receiver via the antenna, wherein a signal path between the antenna and each of the SPS receiver and the RAT transmitter does not include a filter to physically separate the first signal from the second signal.

15. The non-transitory computer readable medium of claim 14, wherein the low power level is selected based on a determination of a strength of the second signal at a receiving station.

16. The non-transitory computer readable medium of claim 15, wherein the low power level is selected based on at least one of: a distance between the antenna and the station, or a degree of interference experienced by a prior signal transmitted by the antenna and received at the station.

17. The non-transitory computer readable medium of claim 14, wherein the low power level is selected based on a power level of a signal received from a station.

18. An apparatus, comprising:
 means for determining whether a satellite positioning system (SPS) receiver is receiving a first signal via an antenna to determine a location of the SPS receiver; and
 means for, in response to the determination that the SPS receiver is receiving the first signal via the antenna, induce a RAT transmitter to either:
  delay a second signal from being transmitted by the RAT transmitter via the antenna while the first signal is received by the SPS receiver via the antenna and the location of the SPS has not been determined; or
 transmit the second signal at a low power level via the antenna while the first signal is received by the SPS receiver via the antenna, the low power level determined to allow reception of the first signal by the SPS receiver via the antenna, wherein a signal path between the antenna and each of the SPS receiver and the RAT transmitter does not include a filter to physically separate the first signal from the second signal.

19. The apparatus of claim 18, wherein the low power level is selected based on a determination of a strength of the second signal at a receiving station.

20. The apparatus of claim 19, wherein the low power level is selected based on at least one of: a distance between the apparatus and the station, or a degree of interference experienced by a prior signal transmitted by the apparatus and received at the station.

21. The apparatus of claim 18, wherein the low power level is selected based on a power level of a signal received from a station.

* * * * *